(12) United States Patent
Bai et al.

(10) Patent No.: US 8,386,298 B2
(45) Date of Patent: Feb. 26, 2013

(54) COMPETING SIMULATOR IN MULTI-CHANNEL RETAILING ENVIRONMENT AMONG MULTIPLE RETAILERS

(75) Inventors: Xin Xin Bai, Beijing (CN); Jin Dong, Beijing (CN); Ta-Hsin Li, Danbury, CT (US); Hai Rong Lv, Beijing (CN); Wen Jun Yin, Beijing (CN); Bin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 12/859,028

(22) Filed: Aug. 18, 2010

(65) Prior Publication Data

US 2012/0046991 A1 Feb. 23, 2012

(51) Int. Cl.
*G06Q 10/00* (2006.01)
*G06Q 30/00* (2006.01)

(52) U.S. Cl. ............. 705/7.35; 705/7.11; 705/7.29; 705/7.31

(58) Field of Classification Search ......... 705/7.11–7.42
See application file for complete search history.

(56) References Cited

U.S. PATENT DOCUMENTS

| | | | |
|---|---|---|---|
| 7,403,904 B2 | 7/2008 | Abe et al. | |
| 7,438,227 B2* | 10/2008 | Keser et al. | 235/383 |
| 7,519,173 B2 | 4/2009 | Flores et al. | |
| 7,567,914 B2* | 7/2009 | Bonissone et al. | 705/4 |
| 7,653,561 B2* | 1/2010 | Bergstrom | 705/7.22 |
| 7,657,470 B1* | 2/2010 | Delurgio et al. | 705/35 |
| 2002/0169657 A1* | 11/2002 | Singh et al. | 705/10 |
| 2003/0036933 A1 | 2/2003 | Shetty et al. | |
| 2004/0015386 A1 | 1/2004 | Abe et al. | |
| 2004/0073496 A1 | 4/2004 | Cohen | |
| 2004/0093296 A1 | 5/2004 | Phelan et al. | |
| 2004/0264670 A1 | 12/2004 | Flores et al. | |
| 2007/0226082 A1 | 9/2007 | Leal | |
| 2008/0033859 A1 | 2/2008 | Olsen | |
| 2008/0221949 A1* | 9/2008 | Delurgio et al. | 705/7 |
| 2008/0249844 A1 | 10/2008 | Abe et al. | |

(Continued)

OTHER PUBLICATIONS

Mohammad Syed, "A Relational Study on Automated Service Quality, Customer Satisfaction and Financial Performance in the Context of Bank Asia LTD", Independent University Bangladesh webpages, Aug. 24, 2006, http://sb.iub.edu.bd/internship/summer2006/0320454.pdf.

(Continued)

*Primary Examiner* — Jason Dunham
*Assistant Examiner* — Richard Scheunemann
(74) *Attorney, Agent, or Firm* — Scully, Scott, Murphy & Presser, P.C.; Daniel P. Morris, Esq.

(57) ABSTRACT

A system, method and computer program product for providing the ability for retailers to devise a current channel strategy (e.g., adaptive price setting) that considers competitors in a dynamic competing environment, and that enables computing a competitive advantage of a channel. To estimate a price for selling a product j in a commerce channel comprises: a) receiving, at a processor device, real market data including sales and price history data of a product j sold by one or more retailers over one or alternate sales channels t; generating, by the processor device, a competitive advantage parameter value based on the sales and price history data; and, computing, utilizing the competitive advantage parameter value, an optimum price for a particular product to be marketed in one of the one or alternate sales channel.

19 Claims, 6 Drawing Sheets

U.S. PATENT DOCUMENTS

2010/0057525 A1* 3/2010 Wagner et al. ............... 705/10
2010/0223099 A1* 9/2010 Johnson et al. ............... 705/10

OTHER PUBLICATIONS

Danforth, "Variance-Covariance Matrix", University of North Carolina webpages, Jun. 1, 2009, http://www.unc.edu/~jjharden/methods/vcv_week3.pdf.

Covariance Matrix, aiacess webpages, reireived from archives org. Mar. 29, 2012, published Apr. 3, 2009, http://www.sisccess.net/English/Glossaries/GlosMod/e_gm_covariance_matrix.htm.

Varian, R. Micreconomics Analysys, third edition, ISBN 0-393-95735-7, W W Norton and Company, 1992.

Abe et al., "Cross Channel Optimized Marketing by reinforcement learning", ACM 1-58113-888-1040008, Aug. 2004.

Basak et al., "Cross-channel customer mapping", 978-0-7695-3131-108, IEEE, 2008.

Hallowell et al., "The relationship of customer satisfaction, customer loyalty and profitability", International Journal of Service Industry Management, v7, p. 27-42, 1996.

IBM, Business Consulting Services, Cross channel optimization—A strategic roadmap for multichannel retailers, Strategy and Change, IBM, 2005, http://www-935.ibm.com/services/us/imc/pdf/ge510-6204-cross-channel-opt-exec-sum.pdf.

IBM, Business Consulting Services, Cross-channel optimization, Retail, IBM 07, 2005, http://ww-31.ibm.com/cn/services/bcs/ibv/pdf/g510-6186-cross-channel-retailer.pdf.

Zentes et al., "Strategic Retail Management", ISBN 978-3-8349-0287-0, Gabler, 2007 (selection).

* cited by examiner

$$q_{ij}^t(k) = \sum_{m=1}^{M} \left[ \theta_{mj} \underbrace{\left[ \frac{e^{\beta_0 + \beta_1(cost_m - p_m^t(k))}}{1 + e^{\beta_0 + \beta_1(cost_m - p_m^t(k))}} \right]}_{} \Psi_{im}^t(k) \right]$$

250 — PRODUCT RELATIONSHIP

ADJUSTMENT FACTOR

225 — COMPETITIVE ADVANTAGE

COMPETING SIMULATOR IN MULTI-CHANNEL RETAILING ENVIRONMENT AMONG MULTIPLE RETAILERS

BACKGROUND

The present invention relates to multi-channel retailing competition and, more particularly, to a simulation system and methodology to assist retail entities to make multi-channel business decisions dynamically.

Larger retail companies use multiple channels to sell their merchandise. Multiple channels include physical stores, web sites, catalogs, etc. The industry continues to invest heavily to sustain and renew these channels (e.g., global e-retail market size reached $80B in 2006). But multi-channel retailers are facing the challenges of how to make right strategies (price, service, etc.) to adopt the competing and dynamic multi-channel environment. Multi-channel retailing competition is very complex as:

1) There is complex relationship among channels, the channel conflict and channel coordination both should be both considered.
2) The market is dynamic.
3) There are multiple players: retailers from different competitors and customers in different segments.

To make informed decisions, it is necessary for retailers to be able to identify channel influences and customer preferences according to sales and price history of different channels/retailers.

SUMMARY

In one aspect there is provided a system, method and computer program product that provides the ability for retailers to devise a current channel strategy (e.g., adaptive price setting) that considers competitors in a dynamic competing environment, and that enables computing a competitive advantage of a channel.

According to one aspect, there is provided a system, method and computer program product to estimate a price for selling a product j in a commerce channel comprising: a) receiving, at a processor device, real market data including sales and price history data of a product j sold by one or more retailers over one or alternate sales channels t; b) generating, by the processor device, a competitive advantage parameter value based on the sales and price history data; and, c) computing, utilizing the competitive advantage parameter value, an optimum price for a particular product to be marketed in one of the one or alternate sales channel.

Further to this aspect, the generating, by the processor device, of a competitive advantage parameter value comprises: receiving at input nodes of configured neural network, a data vector including the prices and customer preferences of a product j at different times, the configured neural network representing a dynamic procedure of competition in retailer market; propagating the data to one or more intermediate nodes of the configured neural network; and, implementing a function, at the intermediate nodes, for calculating a customer preference parameter value $C_{ij}^t$.

In a further aspect, the method includes implementing a back propagation computation of said neural network to obtain gradients for use in calculating said customer preference parameter value $C_{ij}^t$.

Furthermore, the method comprises: calculating a competitive advantage $\psi_{ij}^k$ of customer segment i and product j in channel t according to:

$$\omega_{ij}^t(k) = \max\{\theta_1 \max\{0, p_j^s - p_j^t\}, \theta_2 \max\{0, C_{ij}^t - C_{ij}^s\}\}$$

where k denotes a time period, $p_j^s$ ($p_j^t$) denotes the price of product "j" in respective channel s(t), $c_{ij}^t$ ($c_{ij}^s$) denotes a calculated customer preference parameter value for respective channel t(s) of customer segment "i" while buying product "j", and theta "θ" represents a relationship between two products. For example, $\theta_1$, $\theta_2$ are the weights of price and customer preference, respectively, e.g., for the same $\theta_2$, $\theta_1$ being large indicates customer valuing price more. $\theta_1$ and $\theta_2$ are identified from real marketing data, hence not only their ratio, but their values are meaningful.

In one embodiment, the method further comprises: producing, at output nodes of said neural network, a simulated sales volume $q_{ij}^t$ based on said competitive advantage parameter value $\psi_{ij}^k$, wherein said sales volume is computed for a channel t in a particular price setting.

Further to this embodiment, the simulated sales volume $q_{ij}^t$ is computed at output nodes of the configured neural network according to:

$$q_{ij}^t(k) = [\text{adjustment factor}]\psi_{im}^t$$

where $\psi_{im}^t$ is the competitive advantage parameter value.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Figure 1:
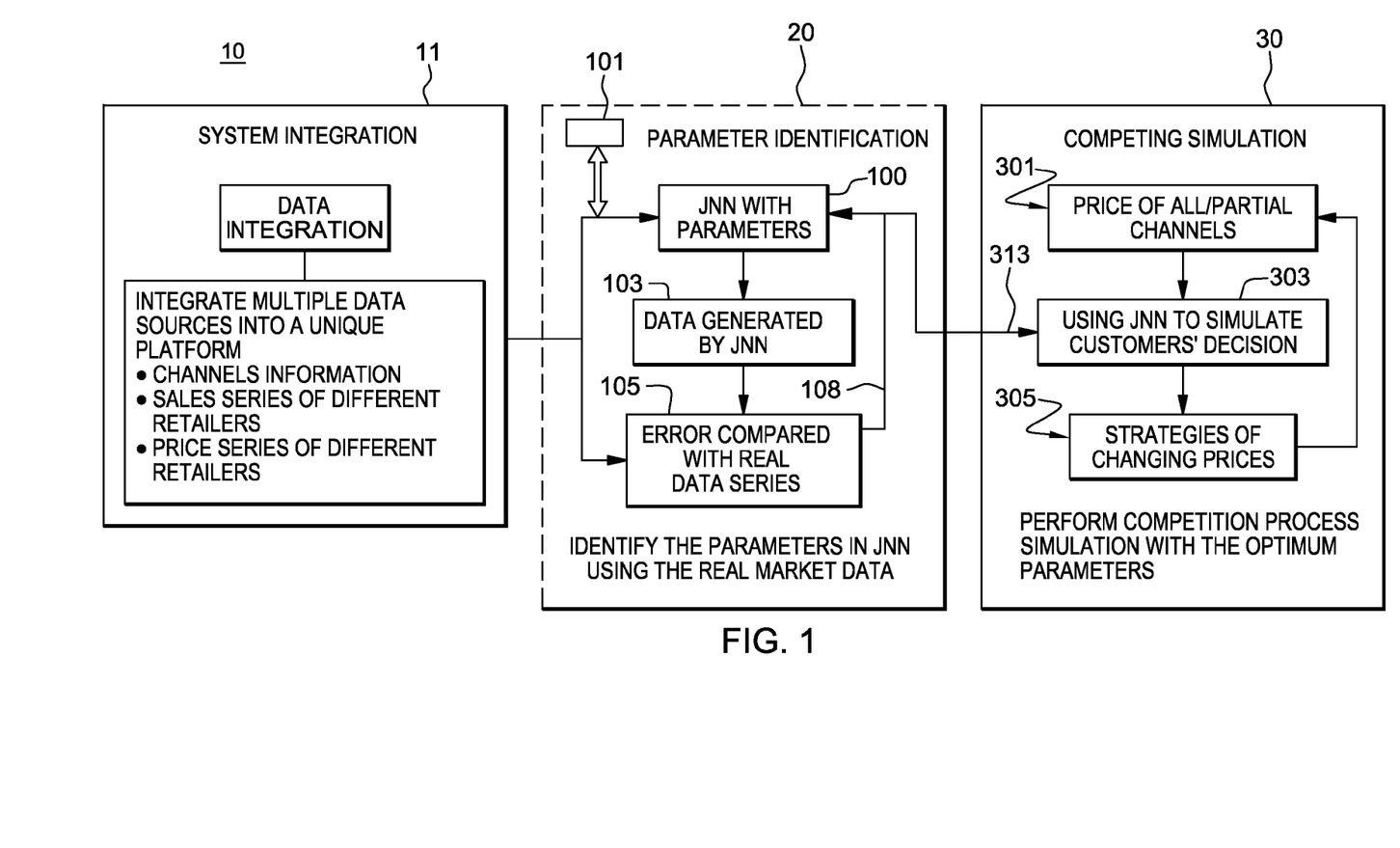
FIG. 1 depicts an overview of one embodiment of the Dynamic Competition Model used for Multi-Channel Retailing among Multiple Retailers according to one embodiment.

FIG. 1 depicts an overview of the Dynamic Competition Model 10 according to one embodiment. The Dynamic Competition Model includes three computation modules: Data Integration 11, Parameter Identification 20, and Competition Process Simulation 30.

1) Data Integration module 11 initializes the Dynamic Competition Model by obtaining (e.g., receiving) and integrating initialization data from multiple sources into a unique platform (such as shown in FIG. 1). These input data include channels information and sales and price history data (e.g., sales series of different retailers, and price series of different retailers). For instance, the input data may include whether or not a retailer sells particular product, the prices of different products in different retailers for a pre-determined amount of time (e.g., 1000 days), the sales quantities of corresponding products in different retailers at different days, etc.

Figure 4:
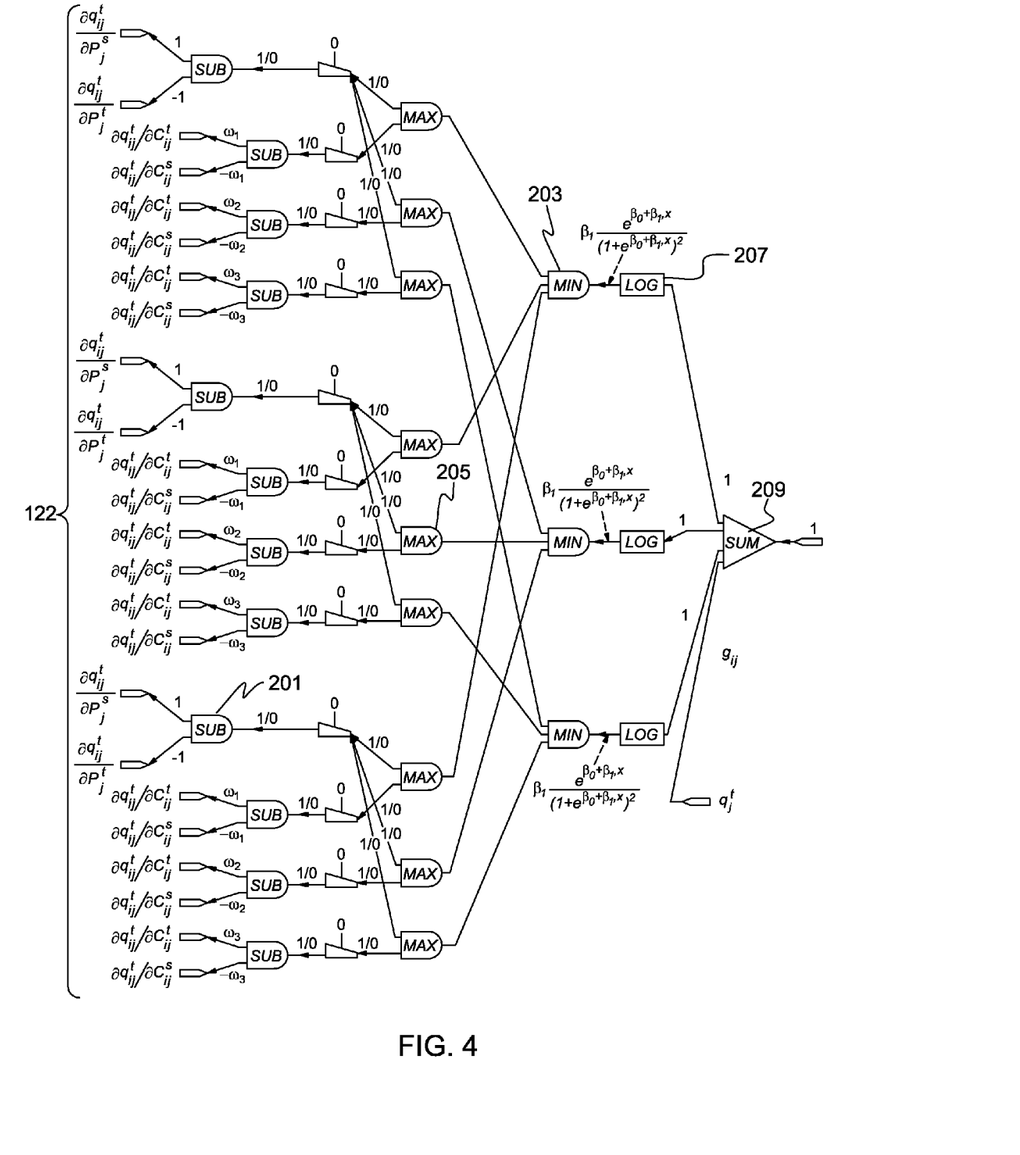
FIG. 4 shows the backward Judge Neural Network that may be implemented for obtaining gradients for computations used according to one embodiment.

2) Parameter Identification module 20 using a Judge Neural Network 100: Apart from the initialization data, there exist key parameters in the Dynamic Competition Model that are first identified. A Judge Neural Network 100 is configured to determine the key parameters in the Dynamic Competition Model. With sales and price history data as the input, the JNN determines key parameters including but not limited to: channel influence and customer preference parameters. Two parameters include $\theta_1$, $\theta_2$ which are independent but will be identified together. The "competitive advantage" variable will affect the estimated sales quantity through the propagation along the neural network. That is, in one embodiment, the parameters in the JNN are identified using real market data. A Newton Descend method commonly used to train unknown parameters may be used, in one embodiment, to reduce the value of the cost function. Alternative to Newton Descend method, the unknown parameters can be trained using, for example, Gradient Descent method, Quasi-Newton method or Generation Algorithm (see Nocedal, Jorge and Wright, Stephen J. (1999) Numerical Optimization, Springer-Verlag, contents and disclosure of which is incorporated by reference). As will be described in detail herein below, the JNN uses the gradients (e.g., the change rates of sales quantity to factors) calculated from the backward neural network of the JNN, e.g., as shown in FIG. 4. In this manner, key parameters are obtained, such as customer preference, which parameter information could have only been retrieved from prior art surveys.

3) Competition Process Simulation 30: After computing these key parameters via the JNN, the configured JNN 100 is used to perform a simulation and produce a final solution such as: an optimization of the price of channels in competition, or, the observing of resulting effects of different price setting and channel coordination strategies.

Figure 2:
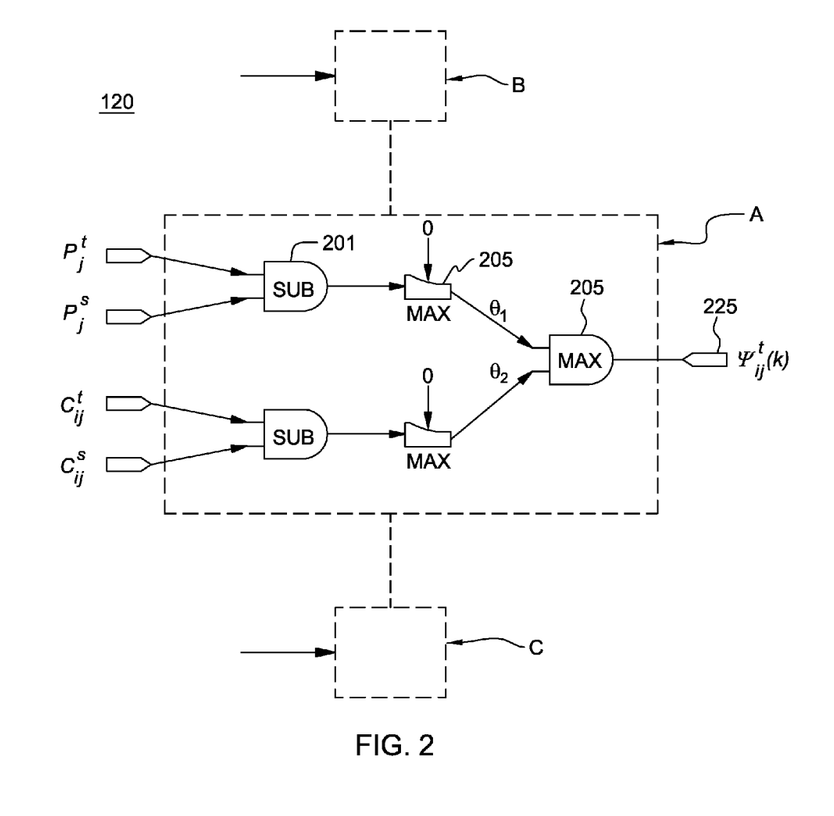
FIG. 2 depicts one example rule of the rules in computing the competitive advantage of a channel according to one embodiment.

In one embodiment, the Judge Neural Network is a type of Neural Network and, as shown in the example Node A of the JNN portion 120 shown in FIG. 2, the JNN includes three layers: an input layer, at least one hidden layer, and an output layer. It differs from artificial neural network (ANN) configurations in how the data from the previous layer propagates to the next layer. However, in the identification procedure, JNN is like a special ANN, where the data propagating to the next layer will keep the same in some range due to the piecewise linear property of JNN. This configuration can save computing load in the backward propagation step.

FIG. 2 illustrates an example portion of a Judge Neural Network 120 including interconnected nodes, e.g., Nodes A-C of the network in the embodiment shown, is a middle layer(s) node connected by "m" in-nodes from a previous layer (not shown), and it connects to "n" out-nodes of a next layer (not shown). In FIG. 2, the Node A of the JNN portion 120 includes elements that denote the relationship between the output and the input(s) of Node A. In one embodiment, the input nodes of JNN include a data vector including the prices and customer preferences of a product in question. The output nodes are the sales volumes. Other variables are represented by middle/hidden nodes. In the embodiment of node A shown in FIG. 2, and, in the embodiment of the backward propagation network shown in FIG. 4, node A "sub" element 201 denotes that the relationship between the outputs and the inputs of the node is a subtraction, i.e., the output of the node equals the difference between two input values. The elements "min" 203 denotes an operation producing an output that is a minimum of the inputs at the node; element "log" 207 denotes an operation producing an output that is a logarithm of the inputs of the node; that the relationship between the outputs and the inputs of the node is a logarithm; element "max" 205 denotes an operation producing an output that is a maximum of the inputs at the node; and, element "sum" 209 denotes an operation producing an output that is a summation of the inputs of the node input values.

Several functions are defined using the "m" in-nodes as the input to compute the output of this node. Based on proper assumptions (i.e., the assumption should be reasonable and accepted by all customers), these functions include:

$$\max\{\max\{p_j^s-p_j^t,0\},\max\{c_{ij}^t-v_{ij}^s\}\}$$

such as shown in FIG. 2, in which term $p_j^s(p_j^t)$ denotes the price of product "j" in channel s(t), and term $c_{ij}^t(c_{ij}^s)$ denotes the customer preference for channel t(s) of customer segment "i" while buying product "j". For example, this function comes from the assumption that if the price in the $s^{th}$ channel is higher and customers like the $t^{th}$ channel more, they will not buy product j from $s^{th}$ channel, i.e., the sales quantity should be zero. The function determines the competitive advantage of a channel, e.g., channel "t" over channel "s" based on an assumption that, while buying product "j", if the customer likes channel "s" more than channel "t" and channel "s" offers a price lower than channel "t", then the customer will buy it from channel "s". Thus, for example, if $p_j^t > p_j^s$ and $c_{ij}^s < c_{ij}^t$, then customer i will not buy product j from channel t. As mentioned, the elements of each node in middle layer(s) such as Node A of FIG. 2 informs what computation to perform when the inputs are identified. For example, use of "sub" element 201 subtracts input2 from input1, and "max" element 205 chooses the maximum value of all the inputs. In the embodiment shown in FIG. 2, the function related with Node A is $$\psi_{ij}^t(k)=\max\{\theta_1\max\{0,p_j^s-p_j^t\},\theta_2\max\{0,C_{ij}^t-C_{ij}^s\}\}$$

After the prices and customer preferences are set in the input layer, the output 225 of a first middle layer such as shown in Node A is obtained according to the functions defined in the network, which then serve as the input to a further (e.g., a second) middle layer (not shown), and the propagation continues until the output layer is determined. For example, a situation exists that the value of output layer can be known without considering some other value. For example, in the forward propagation (see FIG. 4), the output of 203 will be zero if one input of 203 is zero. This is an advantage of JNN, which can save computing time.

In certain portions of the middle layers, a key variable, $\psi_{ij}^t(k)$ 225, where k represents a different time (i.e., different set of training data), is used to represent a calculation of a competitive advantage of customer segment i and product j in channel t, which helps in the computation of variable $q_{ij}^t$ 250, a variable representing sales volume of product j in channel t from customer segment i. For example, the $\psi_{ij}^t(k)$ variable 225 is the bridge of variable 250 and the variables observed like prices. Especially, in identification, the "help" is prominent since the derivatives are computed from backward neural networks where variable 225 is a key middle node as FIG. 2 shows. The larger the variable 225 is, the more sales volume will be, but the relationship is not a simple linear one. Moreover, the interplay between calculation of $\psi_{ij}^t(k)$ and calculation of variable $q_{ij}^t$ also appears in parameters identification, where the sampling data of sales volume is used to train the parameters of variable 225.

In one embodiment, JNN portion 120 shown in FIG. 2 calculates variable $\psi_{ij}^t(k)$ 225 representing the competitive advantage of customer segment i and product j in channel t. Given four inputs (in the embodiment shown), this value is computed from the network as FIG. 2 depicts. For example, when the conditions in FIG. 2 are satisfied, e.g., if $p_j^t > p_j^s$ and $c_{ij}^s < c_{ij}^t$, then competitive advantage variable $\psi_{ij}^k$ computes to zero, and customer i will not buy product j in channel t. This variable may affect the sales volumes; for example, when it equals zero, the sales volume is zero.

In one embodiment, shown in FIG. 2, a supervised learning approach can be used to configure the JNN. For example, a JNN learning algorithm 101 is employed that receives as inputs 102 a series of market data, including the prices and sales volumes at different times. Using initial parameters, described in greater detail below, at 103 the JNN produces data such as a simulated sales volume $q_{ij}^t$. The difference, i.e., error, between the simulated sales volume compared with real sales volumes is calculated at 105. Based on the error feedback 108 to the JNN network, there is computed an adjustment for the parameters, with the gradient calculated by the backward network of JNN, and the JNN produces a new sales volume using the adjusted parameters. This supervised learning process is iterated, i.e., is an iterative procedure and the "best" parameters of JNN are determined from the iteration (s) that occur when the estimation error is "least"; the estimation error, for example, being the sum of squared residuals between sampling sales volume and the sales volume calculated by the JNN.

After computing these parameters, the configured JNN is used to perform a final simulation and produce a final solution, such as described herein below with respect to FIG. 4.

As mentioned, in one embodiment, for the supervised training approach used to train the Judge Neural Network 100, there are four types of input parameters: product price, product cost (cost of manufacturing product or the cost retailers pay), customer preference, and customer population. During each iteration, the sales volume computed by JNN is compared with the real data, and the error is calculated, then the parameters are adjusted, e.g., using Newton method. The gradients are computed from the backward network of JNN 122 of FIG. 4 as part of a known propagation process. In JNN, the grads are used not only to identify the parameters, but also used for competition simulation. That is, in the dynamic simulation of JNN, each retailer will allodially (independently) change its price according to these grads. The iteration proceeds to identify optimum parameters until a mean square error value $$\theta^* = \min_\theta \frac{1}{K}\sum_{t=1}^{K}(q_{obs}(k) - q_{model}(\theta, (p)))^2$$

(e.g., error being the differences between the real sales quantity and the sales quantity computed by JNN) is lower than a pre-set limit. In one embodiment, optimal parameters are the ones getting least error.

Figure 3:
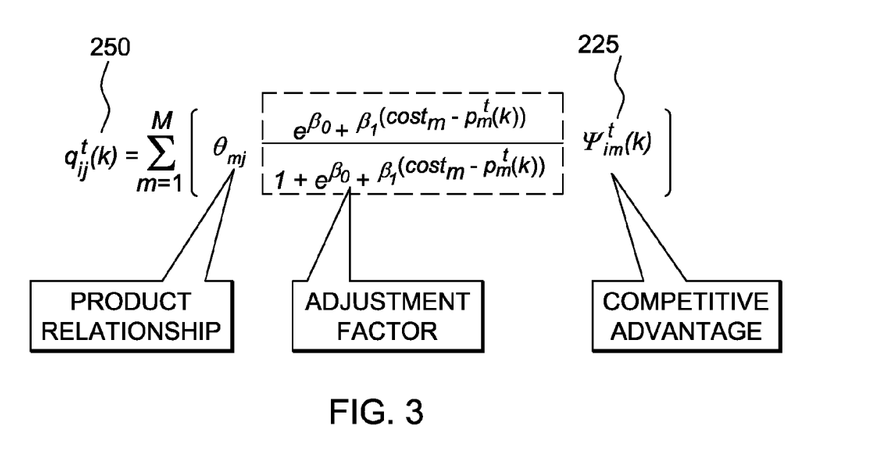
FIG. 3 shows one formula for computing sales volume of a product from a channel according to one embodiment.

FIG. 3 depicts a formula 300 by which a processor or computer device computes output representing a sales volume of product j in channel "t" from customer segment i using competitive advantage variable $\psi_{ij}^k$. That is, $$q_{ij}^t(k) = \sum_{m=1}^{M}\left\{\theta_{mj}\frac{e^{\beta_0+\beta_1(cost_{m1}-p_m^t(k))}}{1+e^{\beta_0+\beta_1(cost_{m1}-p_m^t(k))}}\psi_{im}^t(k)\right\}$$

where $\theta_{mj}$ is the product relationship between two products, e.g., products j and m (for example, if someone purchases a TV set, it is possible that he/she will buy a DVD player. Then the $\theta_{mj}$ parameter between TV set and DVD player would be a large positive value, for example;

$$\frac{e^{\beta_0+\beta_1(cost_{m1}-p_m^t(k))}}{1+e^{\beta_0+\beta_1(cost_{m1}-p_m^t(k))}}$$

is a computed adjustment factor, t is the channel, and k is time (training data). To obtain the value of $q_{ij}^t(k)$, the parameters $\beta_0, \beta_1,$ and $\theta_{mj}$ are first identified in JNN with $\beta_0, \beta_1$ being two factors that affect the shape of a logistic function which is used widely for prediction. It is understood that the logistic function is a very common function and widely used to describe things having upper and lower bounds and is applied to the JNN; however, any other reasonable functions, which are monotone and have upper and lower bounds, are suitable. Cost $t_m$ and price $p_m$ (as explained herein above) and competitive advantage variable $\psi_{ij}^t(k)$ are the input variables of FIG. 3, with the price, cost and $\psi_{ij}^t(k)$ obtained from the JNN node processing of FIG. 2. Thus, from the Judge Neural Network 100, the simulated sales volume $q_{ij}^t$ can be computed in every channel in a particular price setting. In one embodiment, not only does the price affect customer's purchase intention, the sales volume also does.

Thus, in one aspect, the JNN 100 assists in making multi-channel decision(s) dynamically for an entity, e.g., retailer, company or other business organization, by enabling one to identify channel influence and customer preference according to sales and price history of different channels/retailers; and, to give channel strategy (e.g. adaptive price setting) that considers competitors in a dynamic competing environment. That is, JNN describes a dynamic procedure of competition in a retailer market, i.e., when using JNN to make multi-channel decision(s), JNN will consider the change and reaction of all channels—and not just treat them in static state.

Competition Process Simulation

As described above at 30, FIG. 1, the system uses the configured JNN 100 to perform a simulation and produce a final solution such as: an optimization of the price for the products which will be marketed in channels in competition 301, or, the observing of resulting effects of different product price setting and channel coordination strategies 305. The dynamic price setting model 30 to simulate the real multi-channel dynamic competing environment is now described with respect to FIG. 1. In this aspect, at 303, FIG. 1, data, including data for N channels, M products and L customer segments are provided as input 310 to the JNN 100 used in this simulation.

In this embodiment, Equation 1) provides an example objective function of a $t^{th}$ channel represented as $G^t (p_j^t, q_{ij}^t)$ which incorporates sales volumes, profit, market share, etc., represented as:

$$G^t(p_j^t, q_{ij}^t) = \sum_{j=1}^{M}G_j^t(p_j^t, q_{ij}^t) = \sum_{j=1}^{M}(p_j^t - cost_j)\sum_{i=1}^{L}q_{ij}^t. \quad (1)$$

That is, there is obtained an objective function $G^t$ for each channel t, where equation 1) is a special case where the objective function is set to be profit that can be computed by multiplying the sales quantity with the difference between price and cost of product t.

In a further aspect, as shown in FIG. 1, the present invention utilizes the configured JNN 100 to optimize the price of products to be marketed in channels in competition at 305. That is, in an example implementation, a company changes prices in order to obtain the maximum profit and, in addition, to maintain a sales advantage over other competitors. In changing the price to an optimum value for the products which will be market in, the optimized price can be given, the company takes into consideration how other companies (e.g., competitors) change their prices. Equation 2) represents a price iteration formula based on the analysis above as:

$$p_j^t(k+1) = p_j^t(k) + \lambda_t \frac{\partial G_j^t}{\partial p_j^t}(k - t_{lag}) - \sum_{r \in competitor} \xi_{tr} \frac{\partial G_j^r}{\partial p_j^t}(k - t_{lag}) \quad (2)$$

Where k is a time point, $t_{lag}$ denotes the time lag for competition (i.e., as a retailer typically cannot get real-time information to make decision and can only change the price based on some prior information) and is a nonnegative integer, if and only if "t" is an e-channel $t_{lag}=0$ where e-channel represent an internet commerce (where a retailer "r" sell products on-line). Since via the internet, the retailer r will get more real-time information, its time lag is set to zero, showing this advantage of e-channel to traditional ones; and, $\lambda_t$ and $\delta_{tr}$ are parameters describing different behaviors of different retailers. For example, if the retailer will change the price tempestuously, $\lambda_t$ would set to be a large value. $\lambda_t$ and $\delta_{tr}$ are the parameters describing the behaviors of retailers. Like $\lambda_t$, if the retailer will change the price tempestuously, $\delta_{tr}$, would set to be a large value. The difference between $\lambda_t$ and $\delta_{tr}$ is that $\lambda_t$ is trying to increase own sales volume while $\delta_{tr}$ considers to decrease the sales volume of competitors.

In a further aspect, the method further determines how two channels cooperate when they belong to the same company. Normally, when the sales from one channel increases or drops, sales from the other channels is likely to fluctuate in the same way. Accordingly, the formula of equation 2) is revised to equation 3) as follows:

$$p_j^t(k+1) = p_j^t(k) + \lambda_t \frac{\partial G_j^t}{\partial p_j^t}(k - t_{lag}) + \lambda_t \frac{\partial G_j^s}{\partial p_j^t}(k - t_{lag}) - \sum_{r \in competitor} \xi_{tr} \frac{\partial G_j^r}{\partial p_j^t}(k - t_{lag}) \quad (3)$$

Thus, in the competition simulation, time is updated from k=1, and the price in the next time k+1 is computed according to equation (3), where the parameters $\lambda_t$, $t_{lag}$, and $\delta_{tr}$ are set in advance and other variables, e.g., $\theta_1$, $\theta_2$ (FIG. 3), $\beta_0$, $\beta_1$ (in FIG. 4) determined using the described method, are computed in the simulation. As mentioned above, $\lambda_t$ and $\delta_{tr}$ are parameters describing the strategy of a retailer.

$$\frac{\partial G_j^r}{\partial p_j^t}$$

is the grads computed by the backward propagation of JNN. The last summation term represents the endeavor for decreasing the profit of the competitors.

In one embodiment, both G and $$\frac{\partial G}{\partial p}$$

can be obtained from JNN. After a pre-defined K iteration steps, a price is computed that best fits in the business competition. That is, by using the backward propagation of the JNN, the $$\frac{\partial G}{\partial p}$$

can be computed and, then, according to (3), the price at every time point in a dynamic simulation can be obtained.

Figure 5:
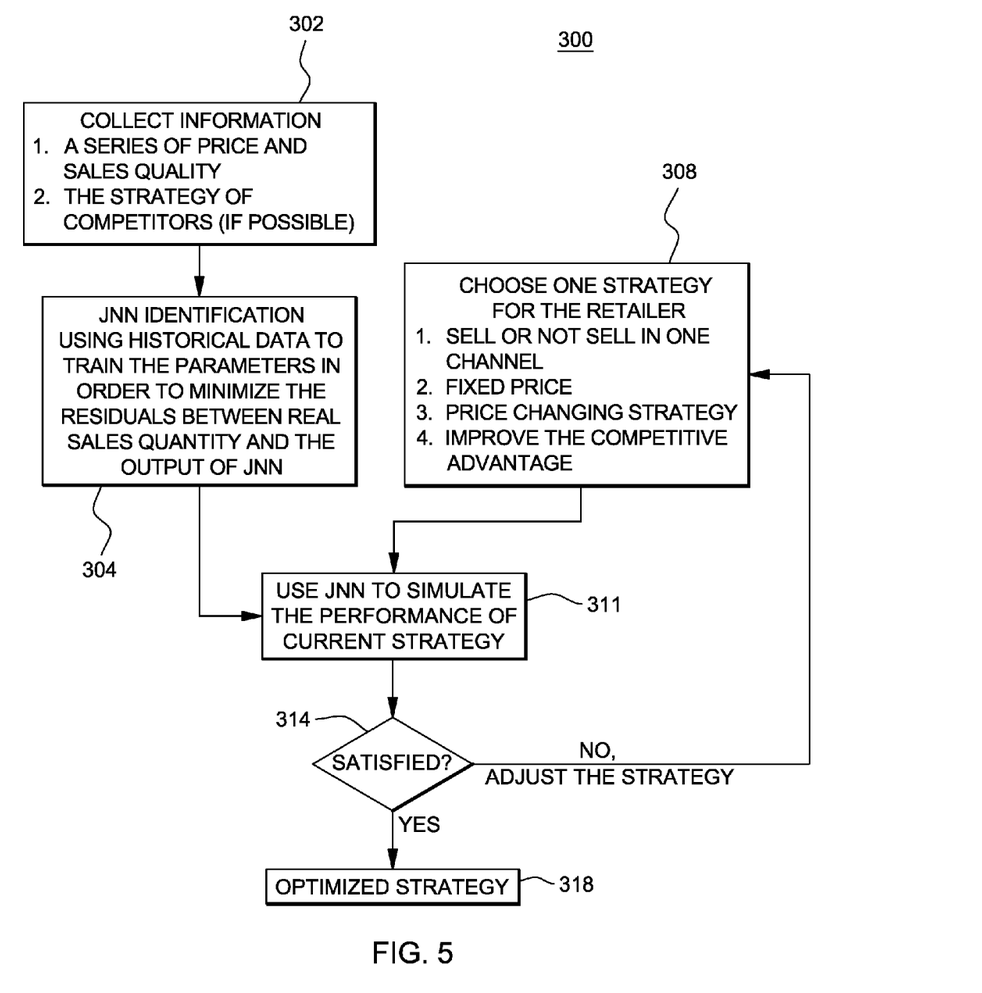
FIG. 5 is a flow chart depicting the method implemented in competing simulation block 30 to enable a retailer to optimize their competitive advantage; and, FIG. 6 illustrates an exemplary hardware configuration performing methods of the Dynamic Competition Model in one embodiment.

FIG. 5 depicts a method implemented in competing simulation block 30 to enable a retailer to optimize their competitive advantage when marketing in different price scenarios, under different channels and with/without competitors. As seen in FIG. 5, the procedure 300 is provided for a retailer to optimize his/her strategy. For this he/she first collects information at 302 including: a series of prices and sales quantities (e.g., data for a channel, product and a customer segment) and strategies of any competitors, and then, implements the method provided herein to identify the parameters of JNN. For example, at 304, the retailer's historical sales data may be used to train the parameters in order to minimize the residuals between real sales quantity and the JNN output. Then, at 308, he/she chooses one strategy and at 311, uses the JNN to simulate the performance of the chosen strategy. For example, the retailer may 1) choose a strategy to sell or not sell a particular product in a particular retail channel in competition; 2) choose a strategy to fix a price of a particular product in a particular retail channel in competition; 3) choose a strategy for changing a price of a particular product in a particular retail channel in competition; or 4) choose a strategy for improving the competitive advantage. Then, at 314 a determination is made as to whether the simulated performance of the strategy is satisfied. If the performance is satisfied, the strategy can be put in to use at 318. Otherwise, he/she can adjust the strategy by returning to step 308, and test/simulate the new strategy in JNN. It is noted that in simulation, one can also adjust the competitive advantage to see if it is changed how the performance will be improved.

Figure 6:
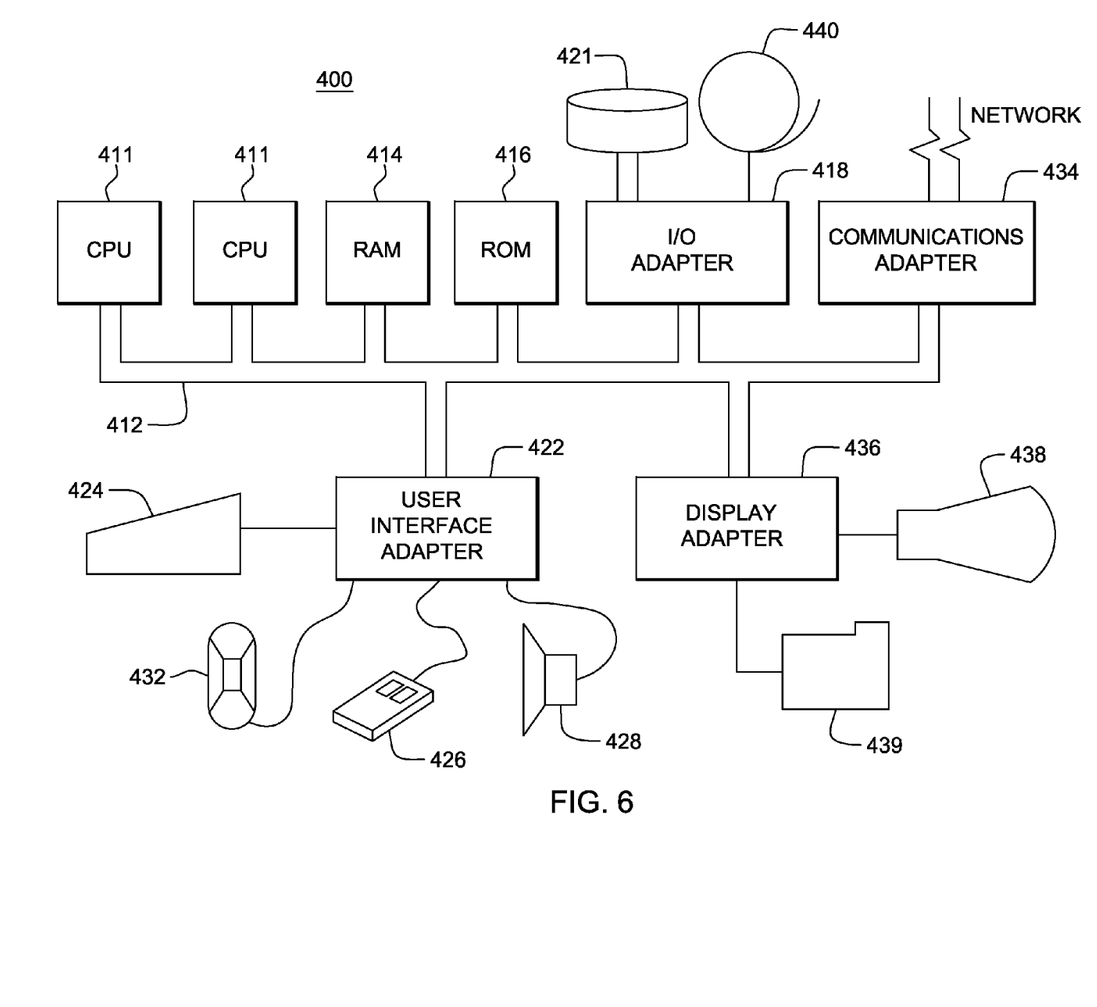

FIG. 6 illustrates an exemplary hardware configuration of a computing system 400 running and/or implementing the method steps described herein. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations (e.g., FIG. 1) and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described our invention, what we claim as new, and desire to secure by Letters Patent is:

1. A computer-implemented method to estimate a price for selling a product j in a commerce channel comprising the steps of:
    a) receiving, at a processor device, real market data including sales and price history data of a product j sold by multiple retailers over alternate sales channels t;
    b) generating, by said processor device, a competitive advantage parameter value based on said sales and price history data, said generating of the competitive advantage parameter value comprising:
        receiving at input nodes of a configured neural network, a data vector including the prices and customer preferences of a product j at different times, said configured neural network representing a dynamic procedure of competition in retailer market;

propagating said data to one or more intermediate nodes of said configured neural network;

implementing a function, at said intermediate nodes, for calculating a customer preference parameter value $C_{ij}^{t}$; and implementing a back propagation computation of said neural network to obtain gradients for use in calculating said customer preference parameter value $C_{ij2}$ calculating the competitive advantage $\psi_{ij}^{k}$ of customer segment i and product j in channel t according to:

$$\psi_{ij}^{t}(k) = \max\{\theta_1 \max\{0, p_j^s - p_j^t\}, \theta_2 \max\{0, C_{ij}^t - C_{ij}^s\}\}$$

where k denotes a time period, $p_j^s$($p_j^t$) denotes the price of product "j" in respective channel s(t), $c_{ij}^t$($c_{ij}^s$) denotes a calculated customer preference parameter value for respective channel t(s) of customer segment "i" while buying product "j", and $\theta_1$, $\theta_2$ are the weights of price and customer preference, respectively;

c) computing, utilizing said competitive advantage parameter value, a simulated sales volume $q_{ij}^{t}$, for a channel t in a particular price setting, said simulated sales volume used in calculating an optimum price for a particular product to be marketed in one of said alternate sales channel.

2. The method as claimed in claim 1, wherein said simulated sales volume $q_{ij}^{t}$ is computed at output nodes of said configured neural network according to:

$$q_{ij}^{t}(k) = [\text{adjustment factor}] \psi w_{im}^{t}$$

where $\psi_{im}^{t}$ is said competitive advantage parameter value.

3. The method as claimed in claim 1, further comprising: configuring said neural network by:

inputting initial parameters and sales and channel history data for training said neural network;

adaptively determining, using said sales and price history data, said customer preference parameter value for said product j, said adaptively determining including:

i) determining a difference between a simulated sales volume $q_{ij}^{t}$ and a real sales volume; and, based on the difference, adjusting said one or more input parameters;

ii) producing a new simulated sales volume using said adjusted said one or more input parameters; and, iterating steps (i) and (ii) until said difference is below a threshold, whereby said initial parameters are optimized for determining said simulated sales volume $q_{ij}^{t}$.

4. The method as claimed in claim 1, further comprising:

performing a simulation, using said configured neural network, to dynamically optimize a price of selling a product j in sales channels in competition.

5. The method as claimed in claim 4, wherein said dynamic price optimization of selling a product j comprises: generating an objective function which can be solved for calculating a sales volume, a profit, and a retailer market share of a $t^{th}$ channel.

6. The method as claimed in claim 5, wherein said objective function is governed according to:

$$G^t(p_j^t, q_{ij}^t) = \sum_{j=1}^{M} G_j^t(p_j^t, q_{ij}^t) = \sum_{j=1}^{M}(p_j^t - \text{cost}_j)\sum_{i=1}^{L} q_{ij}^t$$

where $G^t(p_j^t, q_{ij}^t)$ is a profit obtained by multiplying a sales quantity $q_{ij}^{t}$ with a difference between price $p_j^t$ and a cost $\text{cost}_j$.

7. The method as claimed in claim 1, further comprising:

performing a simulation, using said configured neural network, to obtain one or more resulting effects of alternate sales channels by selling product j at one or more different price settings.

8. The method as claimed in claim 7, wherein said performing a simulation includes configuring said neural network to compute a price iteration based on channels information, sales series of different retailers, and price series of different retailers, said price iteration governed according to:

$$p_j^t(k+1) = p_j^t(k) + \lambda_t \frac{\partial G_j^t}{\partial p_j^t}(k - t_{lag}) - \sum_{r \in competitor} \xi_{tr} \frac{\partial G_j^r}{\partial p_j^t}(k - t_{lag})$$

wherein r is a retailer who sells products j, $p_j^t(k+1)$ is a price at point in time k, $t_{lag}$ denotes the time lag for competition, parameters $\lambda_t$ and $\xi_{tr}$ each describe a strategy of a retailer, $$\frac{\partial G_j^r}{\partial p_j^t}$$

are gradients computed by backward propagation performed using said neural network; and, summation term $$\sum_{r \in competitor} \xi_{tr} \frac{\partial G_j^r}{\partial p_j^t}(k - t_{lag})$$

represents decreasing a profit of the competitors.

9. The method as claimed in claim 1, further comprising: configuring said neural network to obtain one or more resulting effects of alternate sales channels by selling product j at one or more different price settings.

10. The method as claimed in claim 9, further comprising using said configured said neural network to compute a price iteration governed according to:

$$p_j^t(k+1) =$$
$$p_j^t(k) + \lambda_t \frac{\partial G_j^t}{\partial p_j^t}(k - t_{lag}) + \lambda_t \frac{\partial G_j^s}{\partial p_j^t}(k - t_{lag}) - \sum_{r \in competitor} \xi_{tr} \frac{\partial G_j^r}{\partial p_j^t}(k - t_{lag})$$

wherein a price $p_j^t(k+1)$ at point in time in a dynamic simulation is obtained that is optimally fit for a retailer business in competition.

11. The method as claimed in claim 1, wherein said configured neural network is a Judge Neural Network providing a piecewise-linear model constructed by nodes having one or more min, max, sum and subtraction elements.

12. A system comprising:

a memory;

a processor unit coupled to said memory, said processor unit configured to perform a method comprising:

a) receiving, at said processor device, real market data including sales and price history data of a product j sold by multiple retailers over alternate sales channels t;

b) generating, by said processor device, a competitive advantage parameter value based on said sales and price history data, said generating of the competitive advantage parameter value comprising:

receiving at input nodes of a configured neural network, a data vector including the prices and customer preferences of a product j at different times, said configured neural network representing a dynamic procedure of competition in retailer market;

propagating said data to one or more intermediate nodes of said configured neural network;

implementing a function, at said intermediate nodes, for calculating a customer preference parameter value $C_{ij}^{t}$, said calculating said customer preference parameter value $C_{ij}^{t}$ obtaining gradients by implementing a back propagation computation of said neural network;

calculating the competitive advantage of of customer segment i and product j in channel t according to:

$$\psi_{ij}^{t}(k) = \max\{\theta_1 \max\{0, p_j^s - p_j^t\}, \theta_{2max}\{0, C_{ij}^t - C_{ij}^s\}\}$$

where k denotes a time period, $p_j^s(p_j^t)$ denotes the price of product "j" in respective channel s(t), $c_{ij}^t(c_{ji}^s)$ denotes a calculated customer preference parameter value for respective channel t(s) of customer segment "i" while buying product "j", and $\theta_1$, $\theta_2$ are the weights of price and customer preference, respectively; and, c) computing, utilizing said competitive advantage parameter value, a simulated sales volume $q_{ij}^t$ for a channel t in a particular price setting, said simulated sales volume used in calculating an optimum price for a particular product to be marketed in one of said alternate sales channel.

13. The system as claimed in claim 12, wherein said simulated sales volume $q_{ij}^t$ is computed at output nodes of said configured neural network according to:

$$q_{ij}^t(k) = [\text{adjustment factor}] \psi_{im}^t$$

where $\psi_{im}^t$ is said competitive advantage parameter value.

14. The system as claimed in claim 12, further comprising:

configuring said neural network by:

inputting initial parameters and sales and channel history data for training said neural network;

adaptively determining, using said sales and price history data, said customer preference parameter value for said product j, said adaptively determining including:

i) determining a difference between a simulated sales volume and a real sales volume; and, based on the difference, adjusting said one or more input parameters;

ii) producing a new simulated sales volume using said adjusted said one or more input parameters; and, iterating steps (i) and (ii) until said difference is below a threshold, whereby said initial parameters are optimized for determining said simulated sales volume $q_{ij}^t$.

15. The system as claimed in claim 12, wherein said configured neural network is a Judge Neural Network providing a piecewise-linear model constructed by nodes having one or more min, max, sum and subtraction elements.

16. A computer program product for estimating a price for selling a product j in a commerce channel, the computer program product comprising a tangible storage medium readable by a processor and storing instructions run by the processor for performing a method, the method comprising:

a) receiving, at said processor device, real market data including sales and price history data of a product j sold by multiple retailers over alternate sales channels t;

b) generating, by said processor device, a competitive advantage parameter value based on said sales and price history data, said generating of the competitive advantage parameter value comprising:

receiving at input nodes of a configured neural network, a data vector including the prices and customer preferences of a product j at different times, said configured neural network representing a dynamic procedure of competition in retailer market;

propagating said data to one or more intermediate nodes of said configured neural network;

implementing a function, at said intermediate nodes, for calculating a customer preference parameter value $C_{ij}^{t}$, said calculating said customer preference parameter value $C_{ij}^{t}$ including obtaining gradients by implementing a back propagation computation of said neural network;

calculating the competitive advantage $\psi_{ij}^{k}$ of customer segment i and product j in channel t according to:

$$\psi_{ij}^{t}(k) = \{\theta_1 \max\{0, p_j^s - p_j^t\}, \theta_2 \max\{0, C_{ij}^t - C_{ij}^s\}\}$$

where k denotes a time period, $p_j^s(p_j^t)$ denotes the price of product "j" in respective channel s(t), $c_{ij}^t(c_{ij}^s)$ denotes a calculated customer preference parameter value for respective channel t(s) of customer segment "i" while buying product "j", and $\theta_1, \theta_2$ are the weights of price and customer preference, respectively; and, c) computing, utilizing said competitive advantage parameter value, a simulated sales volume $q_{ij}^t$ for a channel t in a particular price setting, said simulated sales volume used in calculating an optimum price for a particular product to be marketed in one of said alternate sales channel.

17. The computer program product as claimed in claim 16, wherein said simulated sales volume $q_{ij}^t$ is computed at output nodes of said configured neural network according to:

$$q_{ij}^t(k) = [\text{adjustment factor}] \psi_{im}^t$$

where $\psi$hd $im^t$ is said competitive advantage parameter value.

18. The computer program product as claimed in claim 16, further comprising: configuring said neural network by:

inputting initial parameters and sales and channel history data for training said neural network;

adaptively determining, using said sales and price history data, said customer preference parameter value for said product j, said adaptively determining including:

i) determining a difference between a simulated sales volume and a real sales volume; and, based on the difference, adjusting said one or more input parameters;

ii producing a new simulated sales volume using said adjusted said one or more input parameters; and, iterating steps (i) and (ii) until said difference is below a threshold, whereby said initial parameters are optimized for determining said simulated sales volume $q_{ij}^{t}$.

19. The computer program product as claimed in claim 16, wherein said configured neural network is a Judge Neural Network providing a piecewise-linear model constructed by nodes having one or more min, max, sum and subtraction elements.

* * * * *